(12) United States Patent
Liu

(10) Patent No.: US 9,615,605 B2
(45) Date of Patent: Apr. 11, 2017

(54) ELECTRONIC CIGARETTE

(71) Applicant: Qiuming Liu, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 566 days.

(21) Appl. No.: 14/056,535

(22) Filed: Oct. 17, 2013

(65) Prior Publication Data

US 2015/0020828 A1   Jan. 22, 2015

(30) Foreign Application Priority Data

Jul. 16, 2013   (CN) .................... 2013 2 0422812 U

(51) Int. Cl.
*A24F 47/00* (2006.01)
(52) U.S. Cl.
CPC .................... *A24F 47/008* (2013.01)
(58) Field of Classification Search
CPC .................................................... A24F 47/008
See application file for complete search history.

(56) References Cited

U.S. PATENT DOCUMENTS

| | | | | |
|---|---|---|---|---|
| 4,907,604 A | * | 3/1990 | Beloff | A24F 13/18 131/233 |
| 2014/0041655 A1 | * | 2/2014 | Barron | A61M 11/042 128/202.21 |
| 2014/0261493 A1 | * | 9/2014 | Smith | A24F 47/008 131/328 |
| 2014/0366896 A1 | * | 12/2014 | Li | A24F 47/008 131/329 |

\* cited by examiner

*Primary Examiner* — Michael H Wilson
*Assistant Examiner* — Eric Yaary
(74) *Attorney, Agent, or Firm* — Tim Tingkang Xia, Esq.; Locke Lord LLP

(57) ABSTRACT

The disclosure discloses an electronic cigarette. The electronic cigarette comprises an atomizer and a battery rod. A connecting means for connecting the atomizer to the battery rod is formed at a junction between the atomizer and the battery rod. The connecting means comprises a first connecting means and a second connecting means. An engaging part is provided around the edge of a local outer surface of the first connecting means, and a cross section of the engaging part is polygon-shaped. The second connecting means is provided with an access groove, and a stopping part is defined on an end of the access groove. One end of the first connecting means is inserted into the access groove of the second connecting means, and then the end of the first connecting means is rotated so that the engaging part is engaged with the stopping part while assembling.

3 Claims, 4 Drawing Sheets

ELECTRONIC CIGARETTE

CROSS-REFERENCE TO RELATED APPLICATIONS

This non-provisional application claims priorities under 35 U.S.C. §119(a) on Patent Application No. 201320422812.6 filed in P.R. China on Jul. 16, 2013, the entire contents of which are hereby incorporated by reference.

FIELD OF THE INVENTION

The present invention relates to the technical field of electronic-heating technology, and more particularly relates to an electronic cigarette.

BACKGROUND OF THE UTILITY MODEL

At present, an electronic cigarette generally includes an atomizer and a battery rod. The atomizer and the battery rod are connected to each other in thread connection in the prior art. In such case, the atomizer and the battery rod would be connected in dislocation with low reliability, which would be inconvenient for disassembling, which, in turn, would affect the performance of the electronic cigarette. To solve aforementioned technical matter, in the technical field of the electronic cigarette, the atomizer and the battery rod are connected in tight fit, or in magnetic adsorption connection. However, the electronic cigarette is used for smoking cessation. Thus, whether the electronic cigarette can meet users' physiological needs and psychological needs or not, and whether it conforms to users' smoking habits that has been cultivated for many years are important factors, which will directly determine the effect of the electronic cigarette on smoking cessation.

However, if the atomizer and the battery rod are connected in tight fit, it would cause a defect that the connection between the atomizer and the battery rod is rickety. Moreover, user' smoking habits would be changed with such connection way, and users would resist it in mind, which will be bad for smoking cessation and provide a bad feel for users.

SUMMARY OF THE INVENTION

Aiming at the drawbacks in the prior art that the electronic cigarette is operated complexly while the connection between the atomizer and the battery rod of the electronic cigarette is rickety. An electronic cigarette that can be operated simply while connecting, of which the atomizer and the battery rod are connected firmly, is provided in the disclosure.

In one aspect, the electronic cigarette provided in the disclosure comprises an atomizer and a battery rod, wherein a connecting means for connecting the atomizer to the battery rod is formed at a junction between the atomizer and the battery rod; the connecting means comprises a first connecting means and a second connecting means;

A engaging part is provided around the edge of a local outer surface of the first connecting means, and a cross section of the engaging part is polygon-shaped;

The second connecting means is provided with an access groove, and a stopping part is defined on an end of the access groove;

One end of the first connecting means is inserted into the access groove of the second connecting means, and then the end of the first connecting means is rotated so that the engaging part is engaged with the stopping part while assembling.

In one embodiment, a flange is formed on the junction between each two adjacent side wall of the engaging part, and the shape of the access groove is adapting to that of the engaging part; the engaging part is inserted into the access groove of the second connecting means, and then the engaging part is rotated so that the flange of the engaging part and the stopping part are offset with respect to each other in the circumferential direction of the engaging part and is engaged with the stopping part while assembling.

In the embodiment, the engaging part, the access groove and the stopping part are in coaxial.

In the embodiment, the first connecting means comprises a connecting base and a connecting arm, wherein the connecting arm is connected to the connecting base. The connecting base is detachably connected to one end of the battery rod, the end is facing to the atomizer, or the connecting base is detachably connected to one end of the atomizer, the end is facing to the battery rod; the engaging part is configured on one end of the connecting arm, the end is far away from the connecting base. The connecting base, the connecting arm and the engaging part are formed integrally as one piece.

In the embodiment, the connecting means further comprises a third connecting means configured to receive the second connecting means, and the second connecting means and the third connecting means are in coaxial. An interference fit connection occurs between the second connecting means and the third connecting means. The second connecting means may have the third connecting means integrally formed therewith. The third connecting means is detachably connected to the battery rod or the atomizer.

In the embodiment, a first through hole is defined in the center of the first connecting means, which is configured to receive a first electrode and a first insulating sleeve; a second through hole is defined in the center of the third connecting means, which is configured to receive a second electrode and a second insulating sleeve covering an outer surface of the second electrode; the first electrode and the second electrode are electrically connected with each other while the first connecting means is connected to the second connecting means.

In the embodiment, a first block for clamping the first insulating sleeve is provided around the edge of an inside surface of the first through hole located in the connecting arm, and protrudes toward an axis of the first through hole. An electrode sleeve is received in the third connecting means, and a spring is located between the second electrode and the electrode sleeve.

In the embodiment, an end face of the engaging part and an end face of the first connecting end are on the same plane.

When implanting the invention, the following advantages can be achieved: in the disclosure, the battery rod and the atomizer are connected with each other in rotating and engagement. With such connecting way, users can assemble the battery rod and the atomizer together quickly by rotating a small angle. Moreover, the battery rod and the atomizer are connected more firmly, and the electronic cigarette can be operated simply while assembling. Further, users' smoking habits can be confirmed and users' needs can also be met, which can provide a good feel for users so that it is good for smoking cessation.

BRIEF DESCRIPTION OF THE DRAWINGS

The present disclosure can be further illustrated by reading the example with references made to the accompanying drawings, in which.

DETAILED DESCRIPTION OF THE PREFERRED EMBODIMENT

For recognizing the technique character, the object and the effect more clearly, the special implement of the invention is illustrated in detail with references to the accompanying drawings.

Figure 1:
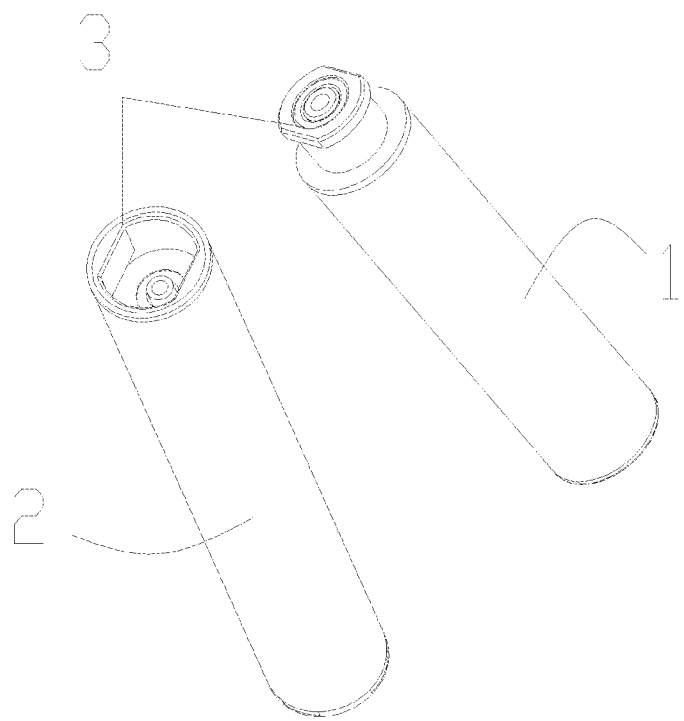
FIG. 1 is a stereogram of an electronic cigarette according to a preferred embodiment of the disclosure.

FIG. 1 shows a stereogram of an electronic cigarette according to a preferred embodiment of the disclosure. As shown in the figure, an electronic cigarette comprises an atomizer 1 and a battery rod 2. A connecting means 3 for connecting the atomizer 1 to the battery rod 2 is formed at a junction between the atomizer 1 and the battery rod 2.

Figure 4:
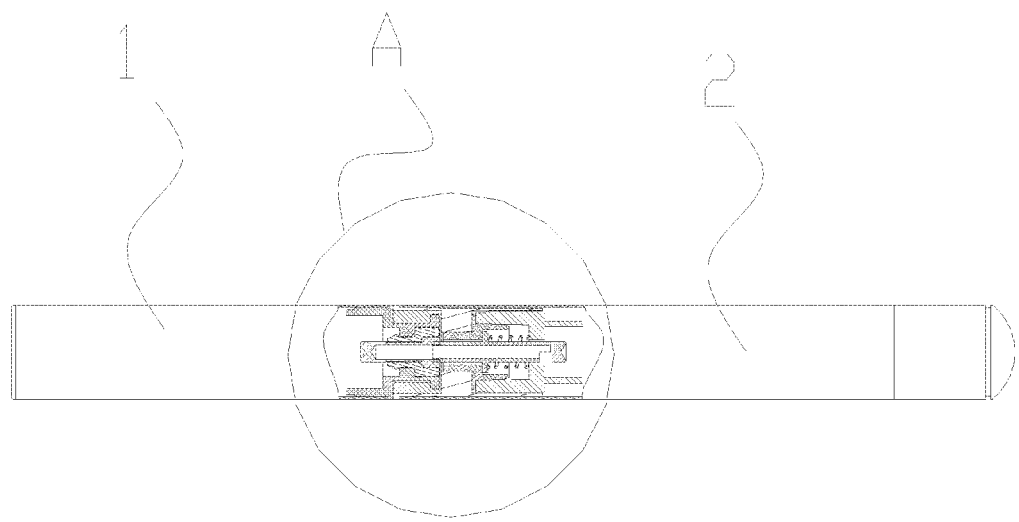
FIG. 4 is an assembled view of an electronic cigarette according to the disclosure.
Figure 5:
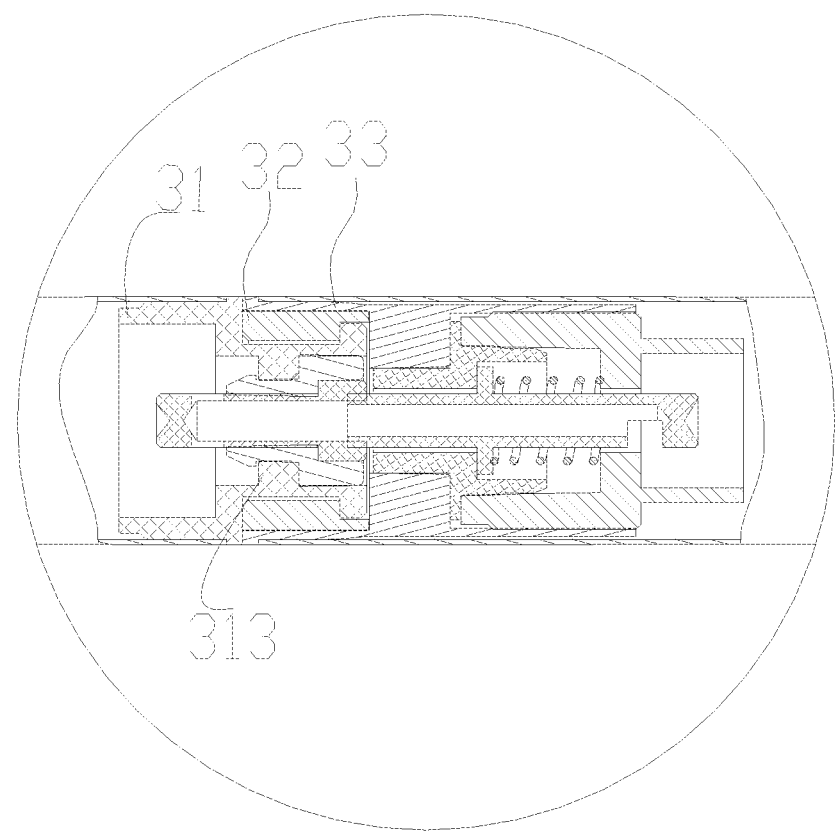
FIG. 5 is an enlarged view of part A in FIG. 4 according to the disclosure.
Figure 6:
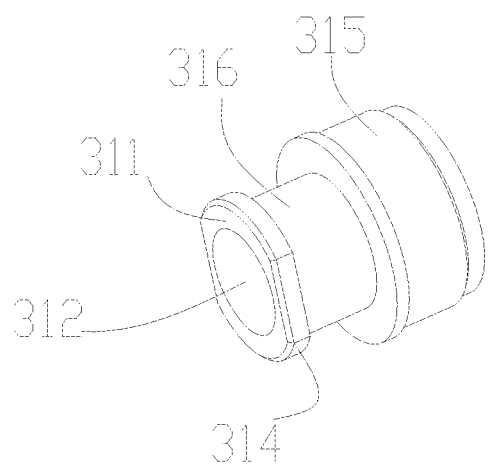
FIG. 6 is a structural view of a first connecting means according to the disclosure.
Figure 7:
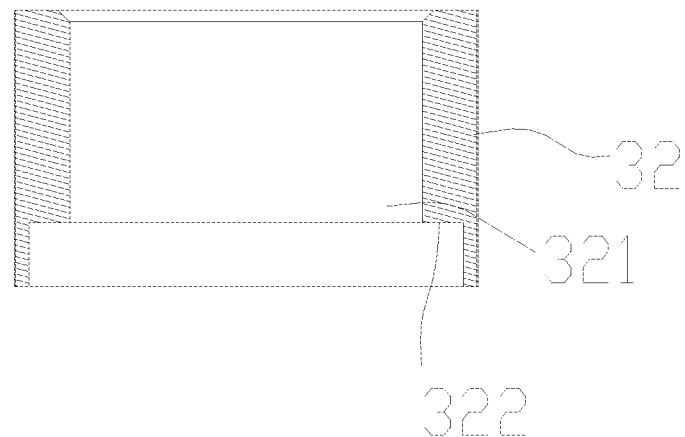
FIG. 7 is a structural view of a second connecting means according to the disclosure.
Figure 8:
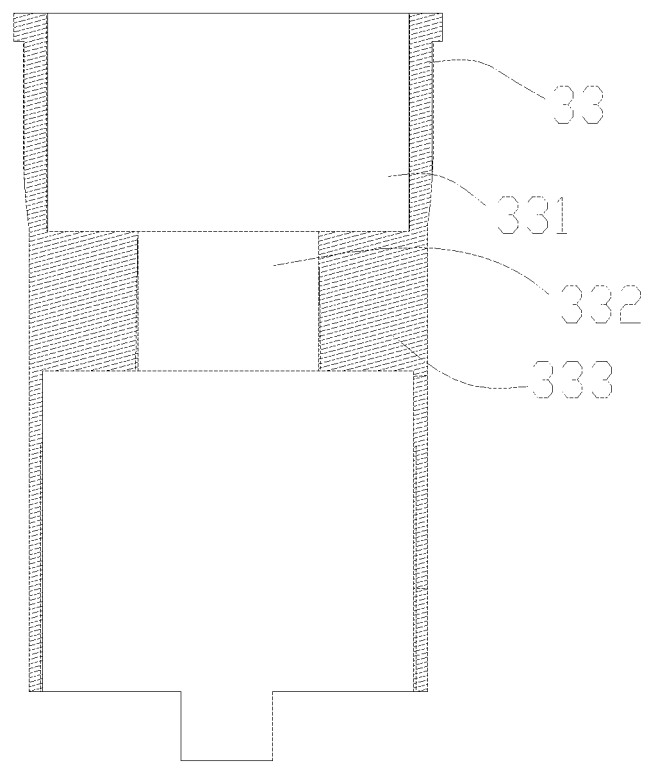
FIG. 8 is a structural view of a third connecting means according to the disclosure.

Reference to FIG. 4, FIG. 5 and FIG. 6, the connecting means 3 comprises a first connecting means 31, a second connecting means 32 and a third connecting means 33. The connecting means 31 is provided with an engaging part 311. The engaging part 311 is provided around the edge of a local outer surface of the first connecting means 31. In this embodiment, the engaging part 311 is located on one end of the first connecting means 31, and the end face of the engaging part 311 and the end face of the first connecting means 31 are on the same plane. In other embodiments, the engaging part 311 also can be formed at the central of the first connecting means, the top of the first connecting means, or the like. A thickness of the engaging part 311 is far less than the length of the first connecting means 31. A cross section of the engaging part 311 may be polygon-shaped. Preferably, it may be waist form-shaped, hexagon-shaped, triangle-shaped or other irregular shape. The cross section of the engaging part 311 of polygon-shape is beneficial for the atomizer 1 to be inserted into the battery rod 2, further make the atomizer 1 and the battery rod 2 be connected to each other more firmly. A flat portion 314 is formed at the junction between each two adjacent side wall of the engaging part 311. In the embodiment, a cross section of the first connecting means 31 is substantially round-shaped, and the engaging part 311 is waist form-shaped.

When the electronic cigarette is assembled, insert the first connecting means 31 into the access groove 321 of the second connecting means 32. And then rotate the first connecting means 31 so that the first connecting means 31 is engaged with the second connecting means 32. The third connecting means 33 is configured to receive the second connecting means 32. The third connecting means 33 and the second connecting means 32 are in coaxial. An interference fit connection may occur between the second connecting means 32 and the third connecting means 33. In other embodiments, the second connecting means 32 and the third connecting means 33 may be formed integrally as one piece.

In the embodiment, the first connecting means 31, the engaging part 311, the second connecting means 32 and the third connecting means 33 are in coaxial. In the other embodiment, the third connecting means 33 may be removed.

In the embodiment, the first connecting means 31 is detachably connected to one end of the atomizer 1, the end is facing to the battery rod 2, and the third connecting means 33 is detachably connected to one end of the battery rod 2, the end is facing to the atomizer 1 correspondingly. In other embodiment, the first connecting means 31 may be detachably connected to one end of the battery rod 2, the end is facing to the atomizer 1, and the third connecting means 33 may be detachably connected to one end of the atomizer 1, the end is facing to the battery rod 2 correspondingly. The detachable connection may be one of thread connection, engagement connection, interference fit connection, or the like.

Figure 2:
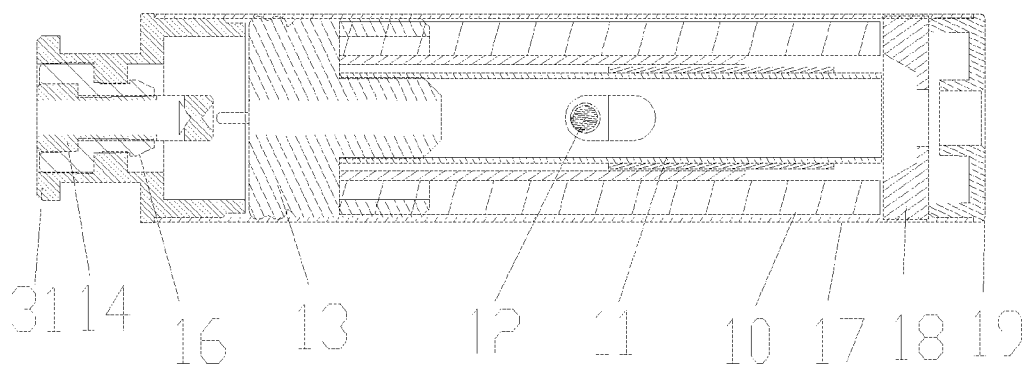
FIG. 2 is a cutaway view of an atomizer of an electronic cigarette in FIG. 1 according to the disclosure.

As shown in FIG. 2, a suction mouth cover 19 is formed at one end of the atomizer 1, the end is far away from the first connecting means 31. The atomizer 1 comprises an outer tube 17. The interference fit connection can occur between the suction mouth cover 19 and the outer tube 17 and between the first connecting means 31 and the outer tube 17 respectively. A sealing base 18, a breather pipe 11 and an atomizer seat 13 are mounted in the inner of the outer tube 17 in orderly, particularly mounted between the suction mouth cover 19 and the first connecting means 31. A heating device 12 is received in the inner of the breather pipe 11 for atomizing the tobacco bar. The suction mouth cover 19 is attached to the top of the outer tube 17 by thread connection, interference fit connection, or the like. In a word, the suction mouth cover 19 and the outer tube 17 are detachably connected to each other. A cavity (not numbered) for receiving storing cotton 10 is formed between the outer surface of the breather pipe 11 and the inner surface of the outer tube 17. A through hole (not shown) configured to receive the heating device 12 is defined on the breather pipe 11 so that the heating device 12 can heat the tobacco bar stored in the storing cotton 10 and make it be atomized. The atomizer 1 further comprises a first electrode 14 received in the first connecting means 31 and a first insulating sleeve 16 configured to receive the first electrode 14, wherein the first electrode 14 runs through the first insulating sleeve 16. The first connecting means 31 and the first electrode 14 are electrically connected to the heating device 12 respectively.

Figure 3:
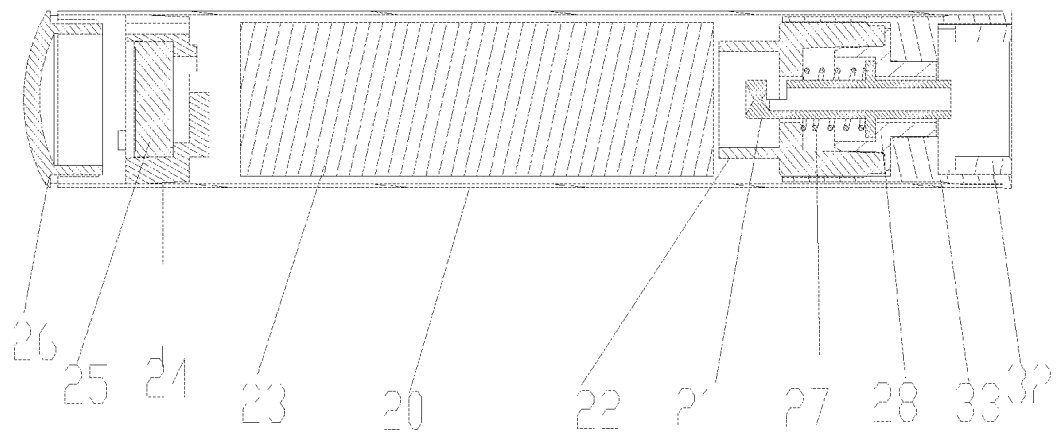
FIG. 3 is a cutaway view of an battery rod of an electronic cigarette in FIG. 1 according to the disclosure.

As shown in FIG. 3, the battery rod 2 comprises a battery sleeve 20. A second connecting means 32 and a third connecting means 33 are mounted on one end of the battery sleeve 20. The second connecting means 32 is shaped to match the first connecting means 31, and the third connecting means 33 is configured to receive the second connecting means 32. A light cap 26 is mounted on another end of the battery sleeve 20, the end is far away from the third connecting means 33. The light cap 26 and the third connecting means 33 are attached to the battery sleeve 20 respectively by interference fit connection; thread connection, or the like. A sensor 25, a base 24 for fixing the sensor 25, a battery 23, an electrode sleeve 22, a second electrode 21, a second insulating sleeve 28 and a spring 27 are mounted in the inner of the battery sleeve 20 in orderly, particularly mounted between the light cap 26 and the second connecting means 32. Wherein, the battery 23 is configured to supply electric power for the aforementioned atomizer 1. The electrode sleeve 22 is inserted into the third connecting means 33 and is engaged with it. The second insulating sleeve 28 is located in the inner of the electrode sleeve 22 and is engaged with it. The second electrode 21 runs through the second insulating sleeve 28. The spring 27 is located between the second electrode 21 and the electrode sleeve 22.

Reference to FIG. 5 to FIG. 8, the first connecting means 31 includes a connecting base 315 and a connecting arm 316 connected to the connecting base 315. Preferably, a diameter of the connecting base 315 is more than that of the connecting arm 316. The connecting base 315 is attached to the outer tube 17 by interference fit connection. A first through hole 312 is defined in the center of the first connecting means 31 in the direction of the axis of the first connecting means 31. The first through hole 312 is configured to receive the first electrode 14 of the atomizer 1 and the first insulating sleeve 16 receiving the first electrode 14. A first block 313 is provided around the edge of the inner surface of the first through hole 312, which is located in the connecting arm 316, and the first block 313 protrudes toward the axis of the through hole 312. The first block 313 is configured to clamp the first insulating sleeve 16. Preferably, the engaging part 311 is formed at one end of the connecting arm 316, the end is far away from the connecting base 315 so that it is beneficial for the engaging part 311 accessing in the inner of the second connecting means 32. Preferably, the engaging part 311, the connecting arm 316 and the connecting base 315 are formed integrally as one piece by extruding or casting so that the connecting means 3 can be assembled simply.

The second connecting means 32 includes an access groove 321 and a stopping part 322 located in the bottom of the access groove 321. The second connecting means 32 is substantially cylindrical-shaped. The access groove 321 defined in the inner of the second connecting means 32 is shaped to match the engaging part 311 to be beneficial for the engaging part 311 inserting into the access groove 321. In the embodiment, the end of the groove wall of the access groove 321 depresses to form a stopping part 322 for engaging with the engaging part 311. Preferably, the length of the connecting means 32 is the same as that of the connecting arm 316 so that the whole connecting arm 316 can be received in the second connecting means 32.

The third connecting means 33 is substantially cylindrical-shaped, and attached to the battery sleeve 20 by interference fit connection. A receiving part 331 for receiving the second connecting means 32 is formed on the top of the third connecting means 33. A second block 333 is provided around the edge of the inner surface of the third connecting means 33, which is located in the bottom of the receiving part 331, wherein the second block 333 protrudes toward the axis of the third connecting means 33. A second through hole 332 is defined in the center of the second block 333, which is configured to clamp the second insulating sleeve 28 and the second electrode 21 received in the second insulating sleeve 28.

When the electronic cigarette according to the disclosure is assembled, the following steps should be executed. Firstly, provide attachment of the first connecting means 31 to the outer tube 17 of the atomizer 1 through the connecting base 315. Place the second connecting means 32 into the receiving part 331 of the third connecting means 33. Connect the third connecting means 33 to the battery sleeve 20 of the battery rod 2 in interference fit connection. Secondly, align the first connecting means 31 of the atomizer 1 with the access groove 321 of the second connecting means 32, which make the first connecting means 31 and the access groove 321 are in coaxial. Insert the first connecting means 31 into the access groove 321. When the engaging part 311 of the first connecting means 31 is located at the junction between the access groove 321 and the stopping part 322, rotate the first connecting means 31, so that the flat portion 314 of the engaging part 311 and the stopping part 322 are offset with respect to each other in the circumferential direction of the engaging part 311. Finally, engage the engaging part 311 with the stopping part 322. In the embodiment, the cross section of the engaging part 311 is waist-form shaped. Two ends of the engaging part 311 are engaged with the stopping part 322 respectively. The outer surface of the connecting arm 316 resists against the inner surface of the access groove 321, and the first electrode 14 received in the first connecting means 31 is electrically connected to the second electrode 21 received in the third connecting means 33. The second electrode 21 is electrically connected to the anode or cathode of the battery 23. The second connecting means 32 is electrically connected to the anode or cathode of the battery 23 through the third connecting means 33. Because the second electrode 21 is connected to the spring 27 that can apply a force on the second electrode 21 to make it do telescopic motion, the first connecting means 31 is easy to be engaged with the second connecting means 32. When the electronic cigarette needs to be disassembled, rotate the engaging part 311 to make the flat portion 314 of the engaging part 311 and the stopping part 322 is parallelly arranged with each other. In such case, the flat portion 314 would move out from the stopping part 322 so as to the first connecting means 31 and the second connecting means 32 are unconnected to each other.

In the disclosure, the battery rod and the atomizer are connected with each other in rotating and engagement. With such connecting way, users can assemble the battery rod and the atomizer together quickly by rotating a small angle. Moreover, the battery rod and the atomizer are connected more firmly, and the electronic cigarette can be operated simply while assembling. Further, users' smoking habits can be confirmed and users' needs also can be met, which can provide a good feel for users so that it is good for smoking cessation.

While the present invention has been described by reference to preferred embodiments, it will be understood by those skilled in the art that various changes may be made and equivalents may be substituted without departing from the scope of the present invention. However, all the changes will be included within the scope of the appended claims.

What is claimed is:

1. An electronic cigarette, comprising an atomizer and a battery rod, wherein a connecting means for connecting the atomizer to the battery rod is formed at a junction between the atomizer and the battery rod;
   the connecting means comprises a first connecting means, a second connecting means and a third connecting means,
   wherein one end of the third connecting means is configured for receiving the second connecting means, and the other end of the third connecting means is detachably connected to the battery rod or the atomizer;
   an engaging part encircles an edge of a local outer surface of the first connecting means, and a cross section of the engaging part is waist form-shaped;
   the second connecting means is provided with an access groove, and a stopping part is defined on an end of the access groove;
   the second connecting means and the third connecting means are coaxial, and the second connecting means is detachebly connected to the third connecting means with an interference fit connection;

one end of the first connecting means is inserted into the access groove of the second connecting means, and then the end of the first connecting means is rotated so that the engaging part is engaged with the stopping part while assembling;

wherein the first connecting means comprises a connecting base and a connecting arm;

wherein the connecting arm is connected to the connecting base, and the connecting base is detachably connected to one end of the battery rod, the end is facing to the atomizer;

or the connecting base is detachably connected to one end of the atomizer, the end is facing to the battery rod;

wherein the engaging part encircles one end of the connecting arm and is a hollow disk structure, the end of the connecting arm is opposite from the connecting base;

and an end face of the engaging part and an end face of the first connecting means are on the same plane; and wherein a flat portion is formed between each two adjacent side walls of the engaging part, a cross section of the first connecting means is substantially round-shaped.

2. The electronic cigarette according to claim 1, wherein the access groove is shaped to match the engaging part;

wherein, the engaging part is inserted into the access groove of the second connecting means, and then the engaging part is rotated so that the flat portion of the engaging part and the stopping part are offset with respect to each other in the circumferential direction of the engaging part and the engaging part is engaged with the stopping part while assembling; and wherein the stopping part for engaging with the engaging part is formed by a depression of an end of a groove wall of the access groove, an opening groove is defined at the depression, a length of the second connecting means is the same as that of the connecting arm so that a whole connecting arm can be received in the second connecting means.

3. An electronic cigarette, comprising an atomizer and a battery rod, wherein a connecting means for connecting the atomizer to the battery rod is formed at a junction between the atomizer and the battery rod;

the connecting means comprises a first connecting means, a second connecting means and a third connecting means;

wherein one end of the third connecting means is configured for receiving the second connecting means, and the other end of the third connecting means is detachably connected to the battery rod or the atomizer;

an engaging part encircles the edge of a local outer surface of the first connecting means, and a cross section of the engaging part is waist form-shaped;

the second connecting means is provided with an access groove, and a stopping part is defined on an end of the access groove;

the second connecting means and the third connecting means are coaxial, and the second connecting means is detachebly connected to the third connecting means with an interference fit connection;

one end of the first connecting means is inserted into the access groove of the second connecting means, and then the end of the first connecting means is rotated so that the engaging part is engaged with the stopping part while assembling;

wherein the first connecting means comprises a connecting base and a connecting arm;

wherein the connecting arm is connected to the connecting base, and the connecting base is detachably connected to one end of the battery rod, the end is facing to the atomizer;

or the connecting base is detachably connected to one end of the atomizer, the end is facing to the battery rod; and the third connecting means is detachably connected to the battery rod or the atomizer wherein the engaging part encircles one end of the connecting arm and is a hollow disk structure, the end of the connecting arm is opposite from the connecting base; an end face of the engaging part and an end face of the first connecting means are on the same plane; and a cross section of the engaging part is waist form-shaped;

wherein a flat portion is formed between each two adjacent side walls of the engaging part, a cross section of the first connecting means is substantially round-shaped;

wherein a first through hole for receiving a first electrode and a first insulating sleeve is defined in a center of the first connecting means;

wherein a second through hole is defined in a center of the third connecting means, which is configured to receive a second electrode and a second insulating sleeve covering an outer surface of the second electrode;

wherein the first electrode and the second electrode are electrically connected with each other while the first connecting means is connected to the second connecting means;

wherein a first block for clamping the first insulating sleeve is provided around the edge of an inside surface of the first through hole located in the connecting arm, and protrudes toward an axis of the first through hole; and wherein an electrode sleeve is received in the third connecting means, and a spring is located between the second electrode and the electrode sleeve.

* * * * *